US005294946A

United States Patent [19]

Gandy et al.

[11] Patent Number: 5,294,946

[45] Date of Patent: Mar. 15, 1994

[54] INK JET PRINTER

[75] Inventors: James Gandy, San Antonio; Myles F. Clauser, New Braunfels; Donald Mickish, San Antonio, all of Tex.

[73] Assignee: Signtech USA, Ltd., San Antonio, Tex.

[21] Appl. No.: 894,245

[22] Filed: Jun. 8, 1992

[51] Int. Cl.$^5$ .......................... B41J 2/04; B41J 2/165; H04N 1/21

[52] U.S. Cl. ................................ 346/140 R; 358/296

[58] Field of Search .............. 346/75, 140 R; 358/296

[56] References Cited

U.S. PATENT DOCUMENTS

| | | | |
|---|---|---|---|
| 2,278,949 | 4/1942 | Murphy . | |
| 3,230,303 | 1/1966 | Macovski et al. . | |
| 3,553,371 | 1/1971 | Suenaga . | |
| 3,763,308 | 10/1973 | Miyata et al. . | |
| 3,867,882 | 2/1975 | Ahlgren et al. . | |
| 4,146,900 | 3/1979 | Arnold | 346/75 |
| 4,281,333 | 7/1981 | Tsuzuki et al. . | |
| 4,403,228 | 9/1983 | Miura et al. | 346/75 |
| 4,410,897 | 10/1983 | Moriguchi et al. . | |
| 4,475,128 | 10/1984 | Koumura | 358/296 |
| 4,547,786 | 10/1985 | Logan et al. . | |
| 4,628,330 | 12/1986 | Suga et al. . | |
| 4,766,921 | 8/1988 | Williams . | |
| 4,839,666 | 6/1989 | Jayne | 346/75 |
| 4,914,522 | 4/1990 | Duffield et al. | 358/75 |
| 4,999,645 | 3/1991 | Grattan et al. | 346/75 X |
| 4,999,651 | 3/1991 | Duffield et al. | 346/140 R |

OTHER PUBLICATIONS

IBM Technical Disclosure Bulletin, vol. 22, No. 6 (Nov., 1979) Ink Jet Nozzle Design, W. L. Dollenmayer.

*Primary Examiner*—George H. Miller, Jr.
*Attorney, Agent, or Firm*—Donald R. Comuzzi

[57] ABSTRACT

The present invention is an ink jet printer utilized to enlarge color images. Signals from a scanned image are converted by a color correction computer into control signals representing the density of the individual pixels of that scanned image. The color density signals are used to control the application of ink from ink jet spray nozzles located on a pair of printheads. Thus, the ink jet printer of the present invention reproduces the image on both sides of a translucent substrate to enhance the quality of the viewed image. The present invention is further provided with dual air sources to apply the ink. A first air source is pulse width modulated to control the amount of ink sprayed onto the substrate. A second air pressure source is continuously applied to the ink jet spray nozzles to remove the excess ink that accumulates about the nozzles during print operations. The present invention, additionally, is provided with heaters and a wiper arm and sponge which operate together to enhance the adherence of the ink onto the substrate.

17 Claims, 11 Drawing Sheets

INK JET PRINTER

BACKGROUND OF THE INVENTION

The present invention relates to ink jet printer systems for reproducing and enlarging color images. A scanner electronically scans an original color image to develop electrical signals representing that image which are then used to control the paint spraying of the larger duplicate image. More particularly, but not by way of limitation, the ink jet printer of the present invention is a large format printer designed for producing color reproductions on an imaging medium for numerous interior and exterior uses including, but not limited to: signs, fleet graphics, backdrops, illuminated panels, architectural displays, and billboards.

With the development of scanning techniques capable of accurately reducing a color image to a series of electrical signals, systems using those signals to reproduce photos, pictures, and the like into enlarged images for use on signs, billboards, etc. have been developed. One such system is U.S. Pat. No. 3,553,371 issued on Jan. 5, 1971 to Suenaga. The Suenaga patent discloses a method for producing an enlarged multi-colored print by scanning an original picture. Electric signals representative of that picture are produced and used to control the rate of discharge of ink from a group of spray nozzles. Each electrical signal corresponds to a pixel and represents the density of ink to be applied to the paper. The electrical signals vary ink density by controlling both the amount of nozzle opening and the flow rate of compressed air past the nozzle. As the nozzles are opened, the variable stream of compressed air flows past the nozzle, thereby picking up the ink and applying it to the paper.

The above method of paint density control experiences problems in ink application. Densely colored pixels require increased ink flow, accomplished through large nozzle openings and increased compressed air flow rates. The expelled ink strikes the paper with sufficient force to cause a paint mist to form which settles back onto the paper in either previously painted or unpainted pixels. The misted ink on the paper may result in noticeable marks on the finished image.

Additionally, the mist settles on the nozzles, resutling in a coloring problem. Excess ink on the spray gun nozzles cause extra ink to be applied to the paper during subsequent spray cycles. The excess ink changes the color density of subsequent pixels. That is, the actual color of the pixels is incorrent from the desired color, thus changing the color of the entire image. The color changes are noticeable to the human eye and result in a reproduced image of poor quality.

An attempt to overcome the problems encountered in the prior art is disclosed in U.S. Pat. No. 4,914,522 issued Apr. 3, 1990 to Duffield, et al. The '522 patent scans a color image to produce control signals representative of the density of the color to be applied to an imaging medium. The '522 patent uses the developed control signal to operate four spray heads which spray ink onto the imaging medium to a desired density. However, unlike Suenaga, the '522 patent produces the desired ink density by modulating the amount of time the ink is applied to the imaging medium rather than modulating the intensity of the ink flow. The '522 patent attempts to solve the misting problem encountered by Suenaga by delivering the ink for longer periods of time under reduced pressure. Although the ink strikes the imaging medium at a reduced pressure, some misting is unavoidable, which results in ink accumulation on the spray head nozzles.

The '522 patent attempts to remove the excess ink by providing a continuous air flow about the nozzles of the spray heads. However, the design of the '522 patent is such that the ink accumulation is not prevented. The '522 patent does not solve the ink accumulation problem because it uses a single constant air pressure source. The single constant air pressure source applies the ink onto the imaging medium with sufficient force to cause misting, but is of insufficient force to prevent the ink from accumulating on the nozzles. The excess ink changes the density of the applied color, thereby changing the overall color of the image as described above.

Furthermore, because the air flow is insufficient to clear the nozzles, they will clog up and cease to function before printing of the entire sign is finished. Once the ink nozzles clog up, they must be cleaned, which is a labor intensive project, extremely wasteful of time. Although cleaning is a problem, the major concern with the '522 patent is that the image cannot be produced in one continuous print. If a reproduced image is not produced in one continuous print, color variations occur which are noticeable to the human eye. That is, incorrect color densities occur which result in the production of incorrect color shades. Thus, the system disclosed in the '522 patent is incapable of producing an enlarged image having the desired color scheme.

As a result of the difficulties encountered in the '522 patent, an alternative design of the spray head was adopted. That design is embodied in U.S. Pat. No. 4,999,651 issued on Mar. 12, 1991 to Duffield, et al. In the '651 patent, the continuous air supply about the nozzles to prevent ink accumulation was eliminated. Instead, housings positioned about the nozzles to minimize the deleterious ink accumulation on the nozzles are provided. The housings operate to shield the nozzles from the mist that results from the ink striking the imaging medium. Although the housings help to reduce the ink accumulation on the nozzles, they do not eliminate it. To overcome the ink accumulation problem, the '651 patent cautions system users to clean the nozzles and the face of the housings at reasonable intervals. Thus, the system of the '651 patent is incapable of producing an image in one continuous print, which again results in incorrect ink densities. Images produced using the '651 patent will have noticeable color flaws.

Accordingly, the ink jet printer system of the present invention implements a design which overcomes the problem of ink accumulation on the spray head nozzles. The present invention is provided with dual pressure sources, a low volume high pressure constant air source to prevent the accumulation of excess ink on the nozzles, and a high volume low pressure constant air source for drawing the ink from the nozzles for application to the imaging medium.

SUMMARY OF THE INVENTION

The ink jet printer of the present invention operates to produce enlarged reproductions of an original image. A conventional scanner scans an image to develop electrical signals which represent each pixel of the image. A color correction computer reads the signals developed by the scanner and converts the developed signals into control signals representative of the color density of each scanned pixel. The control signals from the color correction computer are then fed into a modulator which converts the control signals into pulses, the width of which correspond to the color density of the pixel to be reproduced. The generated pulse signals are used to control the length of time air flows across separate ink jets. The air flow across the ink jets pulls the ink from the jets and delivers it onto a substrate. The signals generated by the modulator pulse width modulate the opening and closing of air flow control valves to alternately apply and remove a constant pressure air source. That is, the length of time air flows past the ink jets is varied according to the desired pixel density. Thus, ink is sprayed pixel by pixel to reproduce the scanned image on the substrate.

Although the present invention embodies many conventional features, additional novel features allow the ink jet printer of the present invention to operate significantly better than conventional image reproducing systems.

First, the present invention is capable of producing a sectioned image on the substrate in one continuous print because its sprayhead design prevents ink jet clogging. The sprayheads of the present invention are connected to two separate air pressure sources which operate to apply the ink and prevent the ink jets from becoming clogged. A low pressure, high volume air source is pulse width modulated as described above to apply the ink onto the substrate to the density desired for the reproduced pixel. A second high pressure, low volume, air source continuously communicates with the ink jets to prevent ink build-up. The prevention of ink build-up by the second high pressure air source produces dual results. With no ink build-up, the ink jets first do not clog, and second, do not produce incorrect colors on the substrate. Color variations occur because the excess ink about the ink jets changes the effective dimensions of the spray means, thus changing the air and ink flow rates resulting in either a change in the color itself or a change in the particular shade of the color applied to the substrate. Thus, the utilization of the second air source makes the present invention a significant improvement over conventional ink jet printer systems.

Second, the present invention employs dual printheads to simultaneously reproduce the same image on both sides of a translucent substrate. Often, billboards and signs operate with background lighting to enhance the ability of people to observe the displayed image. However, in some instances, background lighting causes the colors of the sign to "wash out". That is, the white light added to the image causes the shade of the colors perceived by the human eye to differ from the actual color, thereby ruining the desired effect of the sign. The colors, essentially, appear much lighter than they really are. The present invention eliminates the "wash out" problem experienced with background lighting by producing the same image on both sides. The double-sided image has enough color density to prevent the background lighting from significantly altering the desired color effect.

Third, the present invention utilizes heaters positioned next to the substrate during print operations. A first pair of heaters is located below the printheads to heat the substrate before application of the ink. The heaters heat the substrate before printing because when the substrate is heated, the ink adheres more readily to its surface. In addition, a second pair of heaters is placed above the printheads to dry the ink after its application. Drying of the ink is beneficial because it results in less smeared paint which causes a diminished image effect.

Finally, the present invention provides a wiper arm and sponge mounted onto both printheads below their ink jets. Before any print operations are begun, the wiper arms are adjusted so that the sponges rest against the substrate. Thus, during print operations, the sponges wipe the substrate before actual application of the ink. Wiping the substrate before printing removes foreign substances on the substrate which, if left on the substrate, would cause ink adherence problems.

Still other novel features and advantages of the present invention will become evident to those skilled in art in light of the following detailed description of the preferred embodiment.

DETAILED DESCRIPTION OF THE PREFERRED EMBODIMENTS

Figure 1:
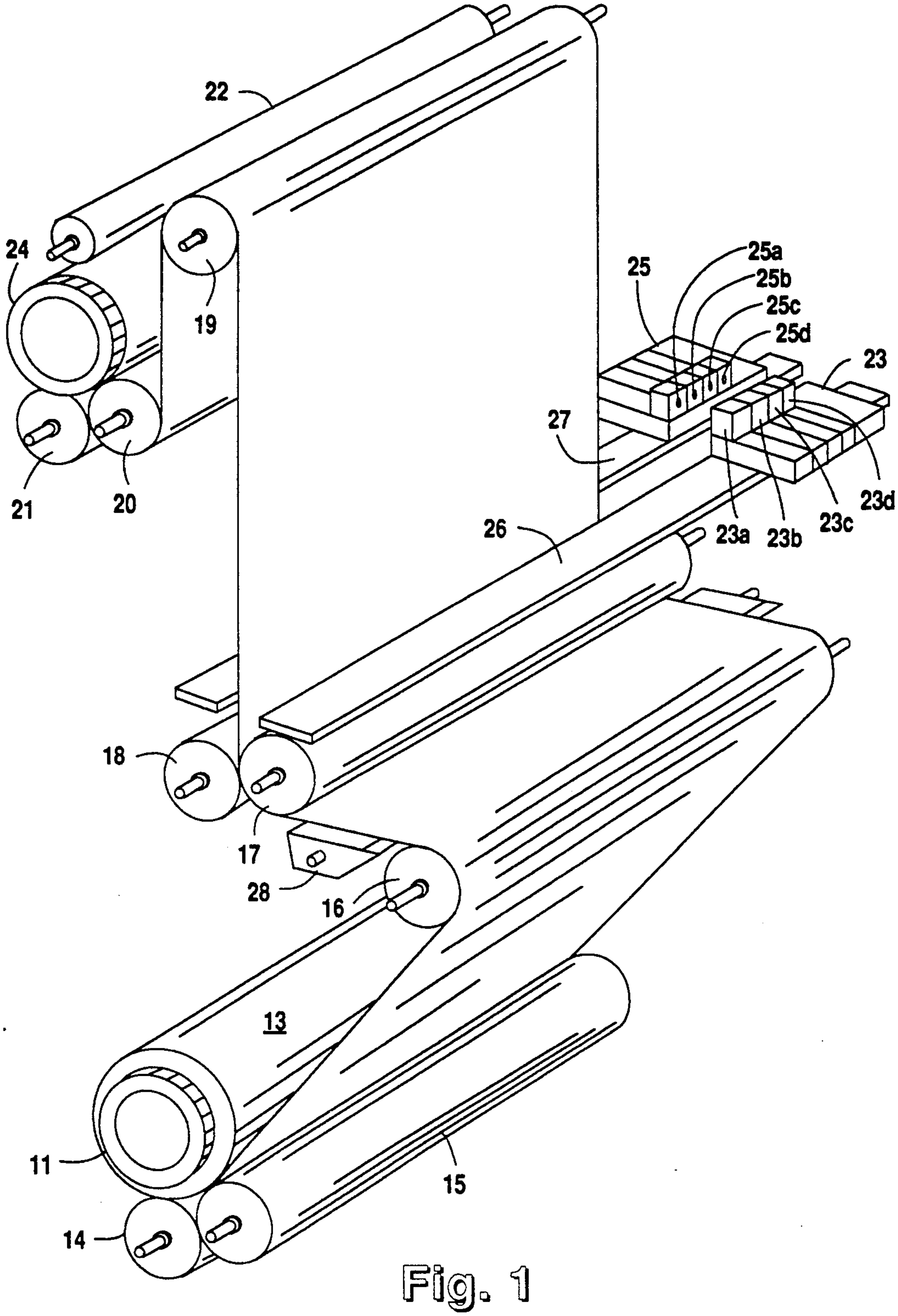
FIG. 1 is a partial perspective view of the ink jet printer system of the preferred embodiment of the present invention showing roller and spraying apparatus configuration.
Figure 2:
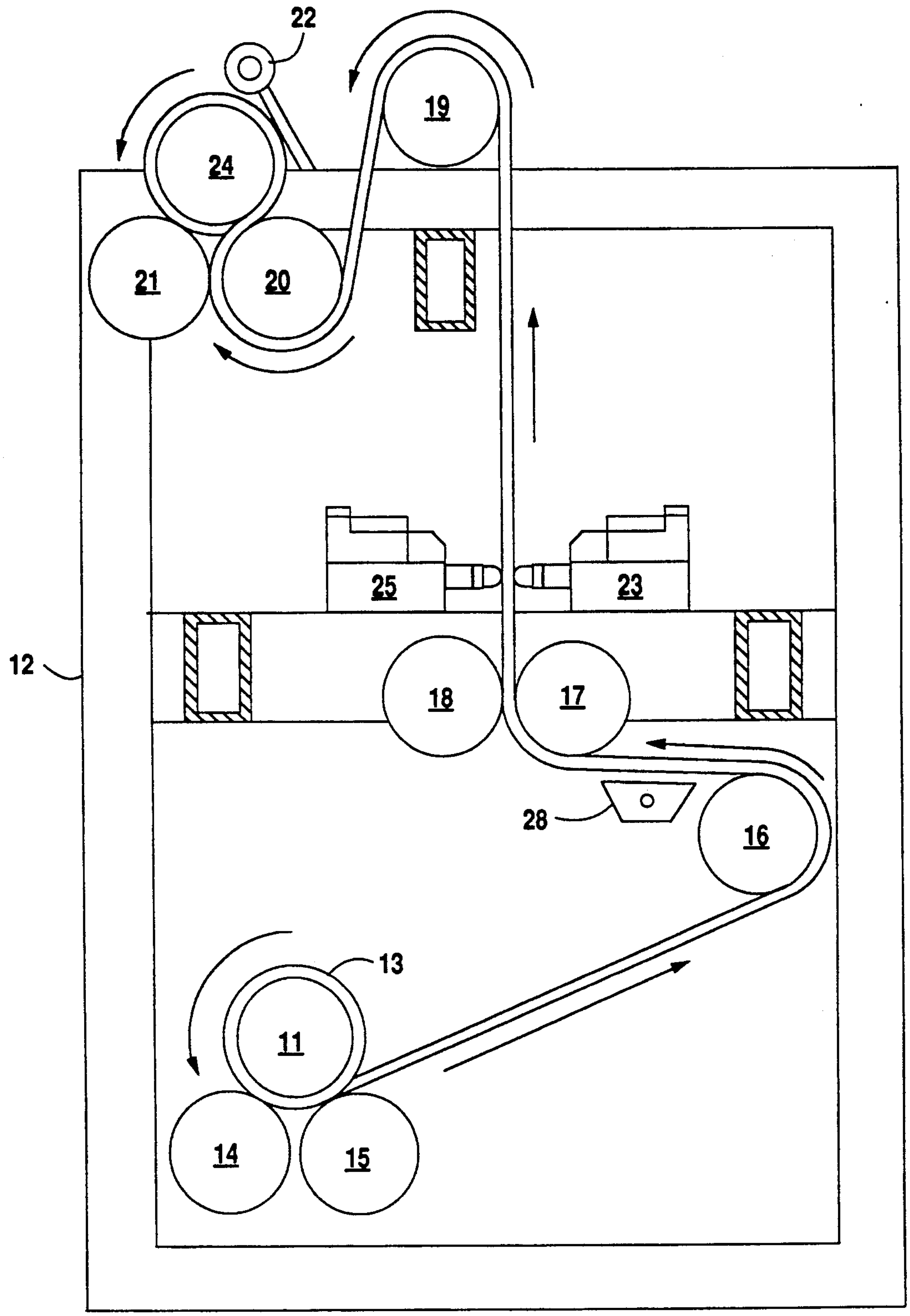
FIG. 2 ida side view of the ink jet printer system of the preferred embodiment of the present invention showing the roller configuration print head assembly.
Figure 3:
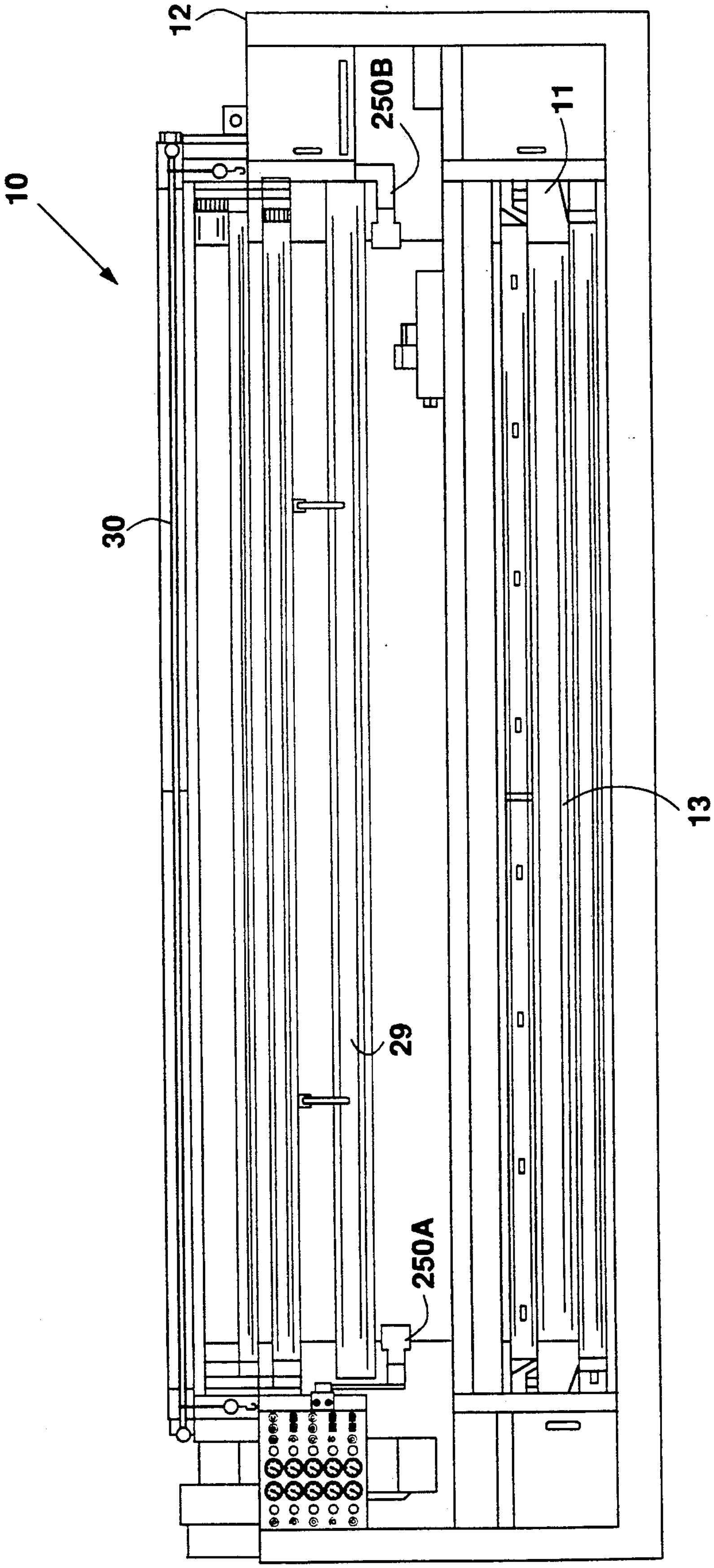
FIG. 3 is a front view of the ink jet printer system of the preferred embodiment of the present invention showing the roller

Referring to FIGS. 1-3, the operation of the preferred embodiment of the present invention will be described. An image to be reproduced is scanned using a scanner (not shown). The scanner is of any conventional type which functions in a conventional manner to produce electrical signals representative of the scanned image. Each signal developed by the scanner corresponds to one very small area of the image. The scanned signals are then processed by a computer (discussed herein) into signals which represent the desired color effects of the particular inks being used. The processed signals are then used to control the operation of the print head assembly shown in FIG. 4 (discussed herein).

Once the print information has been processed and stored by the computer, the printing process begins. Roller 11 is placed in housing 12 of ink jet printer 10 (see FIG. 2) so that it resides on top of rollers 14 and 15. The ends of rollers 14 and 15 are attached to housing 12. Wound about roller 11 is flex-face substrate 13 which is used as the imaging medium. Flex-face substrate 13 is translucent paper, vinyl, or any other translucent sheet material. Ink jet printer 10 further comprises rollers 16-21, also secured at each end to housing 12, for directing flex-face substrate 13 past printheads 23 and 25 and finally about take-up roller 24. Rollers 14 and 15 support roller 11 in a shaftless surface unwind arrangement that allows flex-face substrate 13 to unroll freely from roller 11 towards roller 16. Rollers 16, 17, 19 and 20 alternate on opposing sides of flex-face substrate 13 to maintain tension on flex-face substrate 13 as it passes by printheads 23 and 25 during ink application. Rollers IS and 21 compress flex-face substrate 13 against rollers 17 and 20 respectively, to maintain proper tension and prevent wrinkling of substrate 13. Rollers 20 and 21 further operate to support take-up roller 24 in a shaftless surf ace rewind arrangement similar to rollers 14 and 15. Roller 22 serves to smooth substrate 13 as it rewinds about take-up roller 24.

A pair of stepper motors (not shown) are connected to rollers 16 and 17 and rollers 19 and 20, respectively, using a suitable drive means such as a chain, to drive substrate 13 about the rollers. Each time printheads 23 and 25 reach the end of a line, the computer turns on the stepper motors to increment substrate 13 one line.

Printheads 23 and 25 are each slidably mounted by a carriage (not shown) onto rails 26 and 27, respectively, to traverse substrate 13. The carriages and, thus, printheads 23 and 25, are driven across their respective rails by a reversing motor (not shown) and a pair of drive cables (not shown), with each carriage being connected to one of the cables. At both ends, each drive cable is wound about a spool which is rotatably connected to the reversing motor. Thus, as the reversing motor reverses direction at the end of each line, printheads 23 and 25 are alternately pulled back and forth across rails 26 and 27 to apply ink to one line of substrate 13. Additionally, because printheads 23 and 25 operate simultaneously, both sides of substrate 13 are printed with exactly the same image.

Heat lamp 28 and a second heat lamp (not shown) are placed near substrate 13 to heat it before application of the ink. Heating of substrate 13 helps the ink adhere to its surface. Additionally, heat lamp 29 (FIG. 3) and a second heat lamp (not shown) are placed between printheads 23 and 25 and roller 19 to help dry the applied ink.

Once the image reproduction is finished, take-up roller 24 is detached and removed using crane 30. To remove take-up roller 24, short rods having a loop at one end and being of substantially the same diameter as roller 24 are inserted into each end of roller 24. The hooks on crane 30 are then attached to the protruding loops and take-up roller 24 is lowered to a suitable carrying means.

Figure 4:
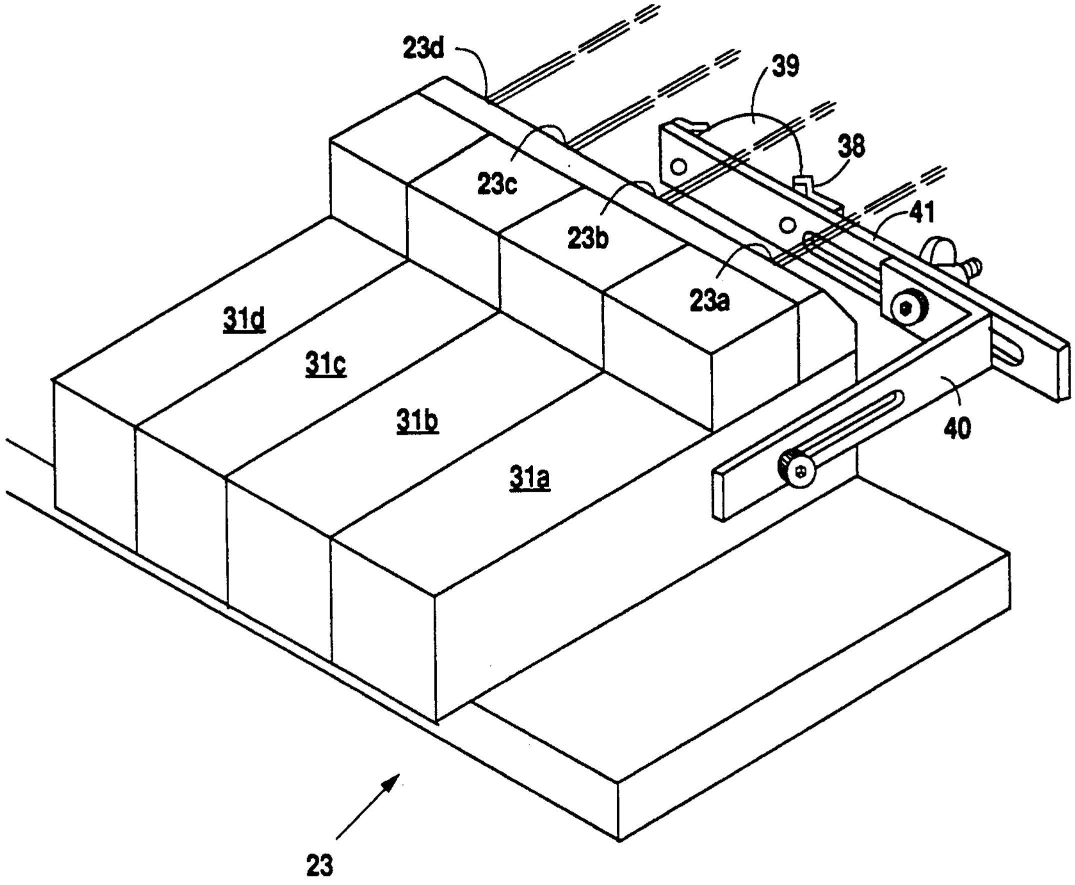
FIG. 4 is a perspective view of the print head assembly of preferred embodiment of the present invention.

Referring to FIG. 4, the operation of printheads 23 and 25 will be described. Printheads 23 and 25 comprise ink spray heads 23A-D and 25A-D, respectively (see FIG. 1). After substrate 13 has been wound about the rollers and connected to take-up roller 24,, the reversing motor and cable system described above drives printheads 23 and 25 across rails 26 and 27, respectively. As printheads 23 and 25 traverse substrate 13, the computer controls the spraying of ink from ink sprayheads 23A-D and 25A-D using the previously stored print information. Each control signal generated from the print information represents one pixel of the image to be reproduced. Thus, ink sprayheads 23A-D and 25A-D spray an area equivalent to one pixel. At the end of each pixel, each of the spray heads is turned off for 100 microseconds in the preferred embodiment to allow the system to reach stable equilibrium before the next pixel begins. Once the end of the line is reached, the two stepper motors incrementally drive their respective rollers, thereby advancing substrate 13 one line. After substrate 13 is advanced one line, printheads 23 and 25 reverse direction and the spraying of the next line begins.

At the end of a user-selected time period, printheads 23 and 25 are driven past the edge of substrate 13, and each of ink spray heads 23A-D and 25A-D discharges onto an ink absorbent felt or cloth belt or filter (see FIGS. 12 and 13) for a predetermined period (½ second in the preferred embodiment). That system purge occurs to supply fresh ink to the sprayheads and prevent the ink from drying on and clogging the ink jets.

Figure 12:
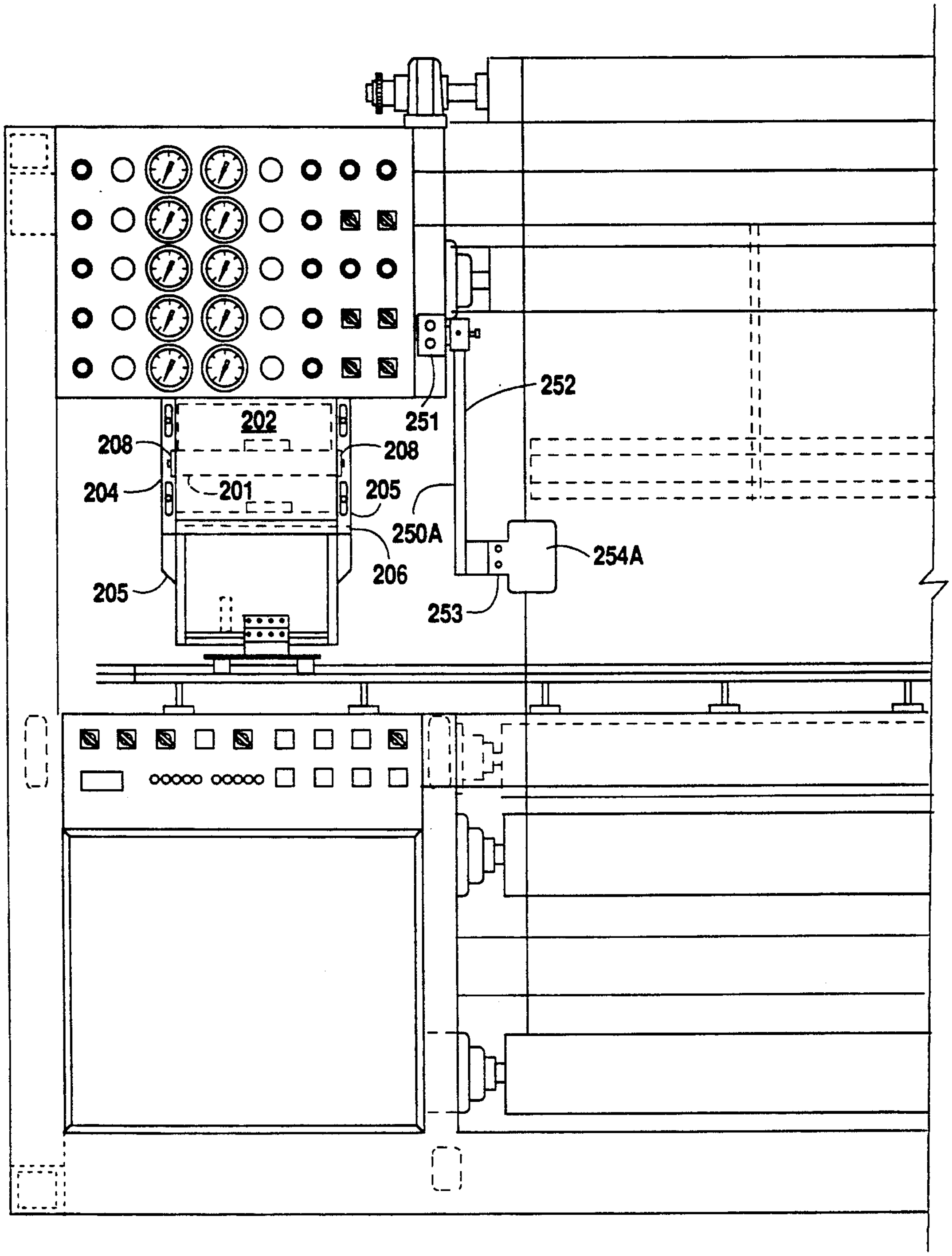
FIG. 12 a front view of the left side of the present invention showing the positional mountings of the ink absorbent felt and one substrate guide member of the preferred embodiment.
Figure 13:
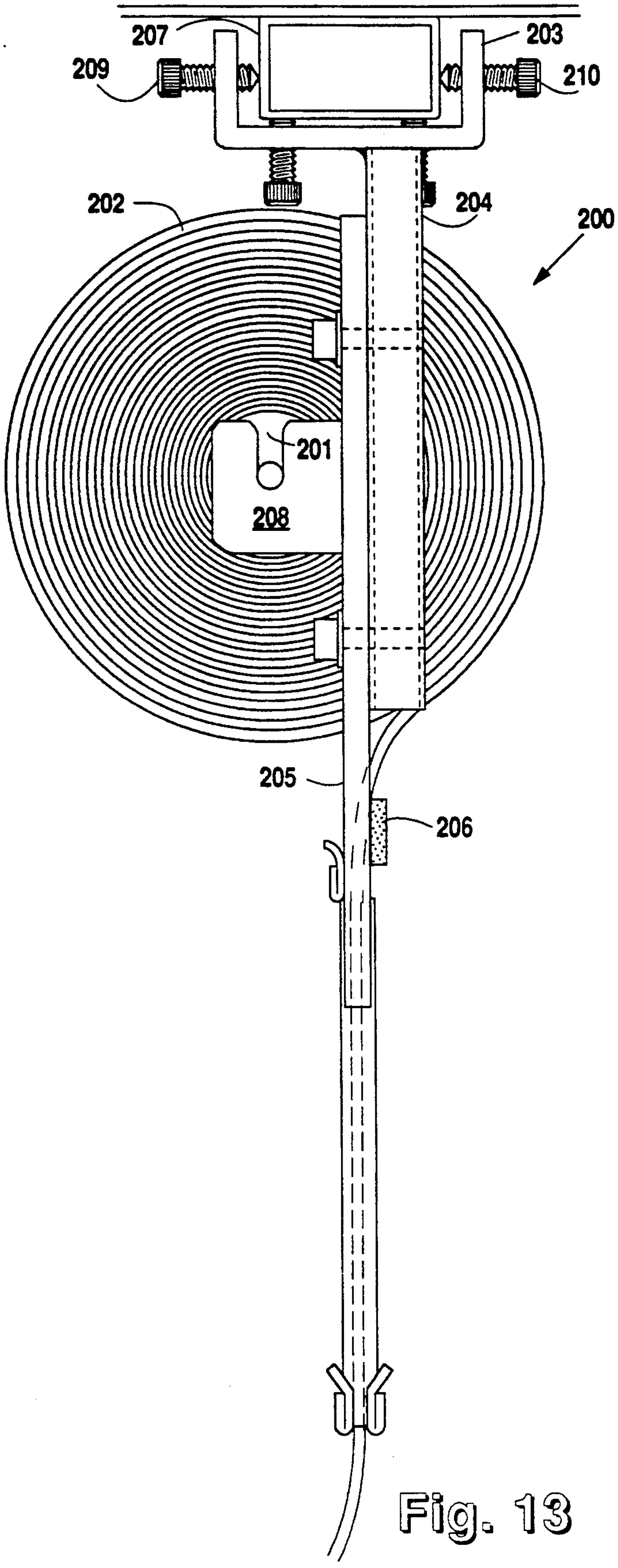
FIG. 13 is a side view of the frame mounting of the ink absorbent felt of the preferred embodiment of the present invention.

Referring to FIGS. 12 and 13, the ink purge system will be described. The purge system comprises frame 200 used to support roller 201 about which is wound ink absorbent felt 202. Frame 200 comprises U-shaped bracket 203, support bracket 204, guide member 205, brace 206, and a pair of roller supports 208. Frame 200 is positioned beyond the left edge of the substrate as shown in FIG. 12 and connected to framework tubing 207 of frame 12 using U-shaped bracket 203 and set screws 209 and 210 (see FIG. 13). Support bracket 204 is attached to U-shaped bracket 203 using any conventional means such as welding and serves to support guide member 205. Guide member 205 includes roller supports 208 and is attached to support bracket 204 by conventional screws or nuts and bolts. Roller supports 208 are placed at opposite ends of guide member 205 and serve to hold roller 201, thus, allowing the unwinding of ink absorbent felt 202 through guide member 205. Guide member 205 holds each end of ink absorbent felt 202 to prevent ink absorbent felt 202 from bunching up during unwinding. Brace 206 provides tension between ink absorbent felt 202 and guide member 205 to further prevent the bunching up of ink absorbent felt 202.

In use, ink absorbent felt 202 is initially pulled down until it reaches the bottom of guide member 205, where it remains during system operation. Once the exposed portion of ink absorbent felt 202 becomes covered with excessive ink, it is again pulled down to expose a clean portion, with the used portion being cut-off and disposed.

Because printheads 23 and 25 operate identically, only the operation of printhead 23 need be discussed. Again referring to FIG. 4, printhead 23 is provided with ink reservoirs 31A-D to supply ink to ink sprayheads 23A-D. In the preferred embodiment, ink reservoirs 31A-D are filled with the colors cyan, magenta, yellow, and black, respectively. Ink sprayheads 23A-D are activated according to the color to be sprayed on substrate 13. For example, if the desired color is purple, the sprayheads holding the cyan and magenta would be activated, thereby delivering a color mix producing purple.

Printhead 23 is additionally provided with wiper arm 38 and sponge 39. Printhead 25 is similarly provided with a wiper arm and sponge. Wiper arm 38 is an elbow shaped arm positioned below ink spray heads 23A-D, attached to printhead 23 using any conventional fastening means such as a screw or nut and bolt. Sponge 39 is attached to wiper arm 38 using any conventional pinning means such as clips. Wiper arm 38 comprises angled member 40 and straight member 41, wherein straight member 41 is adjustably connected to angled member 40 using a conventional bolt and wing nut. Straight member 41 contains a slot which allows adjustment of sponge 39 parallel to printhead 23. Angle member 40 also includes a slot to permit the adjustment of sponge 39 perpendicular to printhead 23. In operation, sponge 39 rests against substrate 13. Sponge 39 wipes substrate 13 as printhead 23 traverses carriage 26. Sponge 39 wipes substrate 13 to remove any migrated plasticizer on substrate 13, thereby allowing the ink to more readily adhere to the substrate.

Figure 5:
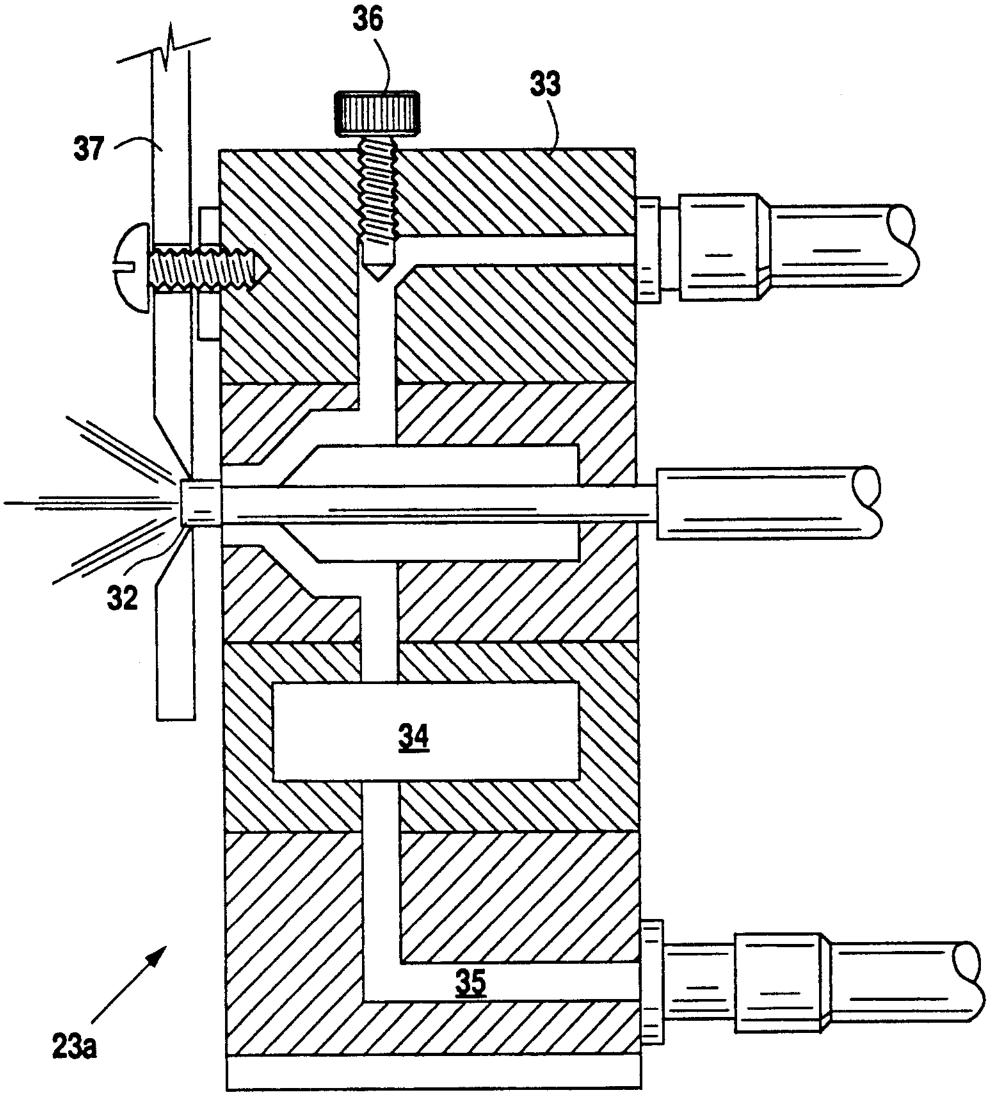
FIG. 5 a cross-sectional view of an ink jet block of the printer head assembly for the preferred embodiment of the present invention.

Referring to FIG. 5, the configuration and operation of the individual ink jets will be described. For the purpose of disclosure, ink sprayhead 23A will be described because each of sprayheads 23A-D and 25A-D operate similarly. Ink spray head 23A comprises ink reservoir 31A which fluidly communicates with ink jet 32. Ink reservoir 31A operates under a gravity siphon feed system to supply ink to the tip of ink jet 32 creating a meniscus. Ink sprayhead 23A further communicates with a high pressure compressed air source (not shown) and a low pressure compressed air source (not shown).

The high pressure compressed air source is continually in communication with ink jet nozzle 32 through passage 33 to supply an air flow around nozzle 32. That continuous air flow operates to prevent ink build-up on nozzle 32 resulting in a color change during continuous operation. Although the high pressure air continually flows past nozzle 32, passage 33 is of sufficiently small diameter to limit the volume of air flowing past nozzle 32. Accordingly, the high pressure air has an insufficient volume to cause ink to be pulled from nozzle 32. Needle@valve 36 regulates the volume of air flow from the high pressure air source through passage 33.

The low pressure compressed air source communicates ink jet 32 through valve 34. Valve 34 opens and closes in response to printing information received from the computer. During a beginning pixel print cycle, valve 34 is opened allowing the low pressure air to flow through passage 35 and across ink jet 32. In contrast to passage 33, passage 35 has a relatively large diameter which permits a large volume of low pressure air to flow past ink jet 32. The volume of low pressure air flowing past 32 is sufficient to draw the meniscus of ink from ink jet 32 causing the ink to be applied to substrate 13. When the desired ink density has been reached, as determined from the print information, valve 34 is closed stopping the flow of the low pressure air, thereby stopping the flow of ink from ink jet 32. Thus, the length of time that valve 34 remains open varies according to the desired color density, only allowing low pressure air to flow across ink jet 32 for the time required to develop the correct color density. For the purposes of disclosure, only ink sprayhead 23A was described, however, it is to be understood that each of ink sprayheads 23B-D and 25A-D also communicates with the two compressed air sources to apply the ink to substrate 13.

Ink spray head 23A is further provided with a spray shield 37 which serves to limit the amount of ink which gathers about ink jet 32. Spray shield 37 is attached to ink spray head 23A using any conventional means such as a threaded screw.

Figure 14:
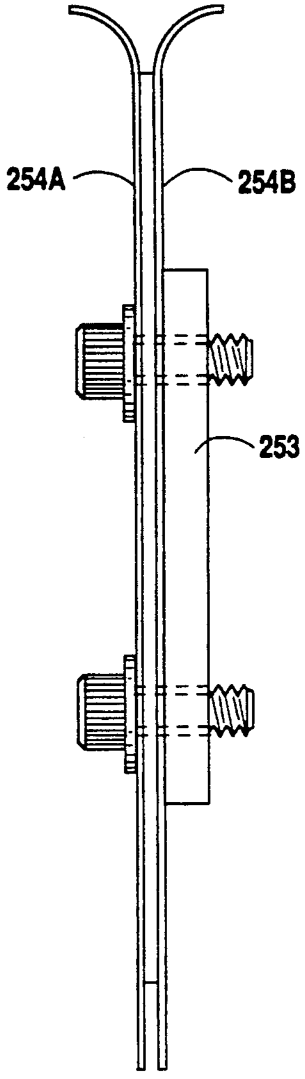
FIG. 14 is a side view of the guide plates of the substrate guide members of the preferred embodiment of the present invention.

A further feature of the present invention to prevent improper color densities from being applied to substrate 13 are substrate guide members 250A and B (see FIG. 3). Referring to FIGS. 12 and 14, substrate guide member 250A will be described. Only substrate guide member 250A is shown and will be described because substrate guide member 250B is identical. Substrate guide member 250A comprises upper bracket 251, post 252, lower bracket 253, and guide plates 254A and B. Upper bracket 251 is mounted to frame 12 as shown in FIG. 12 using screws or nuts and bolts. An opening in upper bracket 251 receives post 252. The position of post 252 within upper bracket 251 is adjustable using a set screw. The lower end of post 252 connects to and supports lower bracket 253. Attached to lower bracket 253 using any conventional means such as screws or nuts and bolts are guide plates 254A and B (see FIG. 14). Guide plates 254A and B serve to hold substrate 13 a fixed distance from printheads 23 and 25. If substrate 13 were not maintained a fixed distance from each of printheads 23 and 25, improper color densities would result because of excess ink being applied to the areas nearest the printheads. Thus, as substrate 13 traverses the rollers, it also feeds through guide plates 254A and B which ensure that the printhead distance remains constant. Substrate guide member 250B operates on the opposite side of substrate 13 to also keep a constant printhead distance.

Although printheads 23 and 25 were only described as being synchronously controlled to produce the exact image on both sides of the imaging medium, one of ordinary skill in the art will readily recognize that the printheads could be controlled asynchronously. That is, each printhead could be controlled separately to produce either different densities of the same image on opposite sides of the imaging medium or two different images on opposite sides of the imaging medium.

Figure 6:
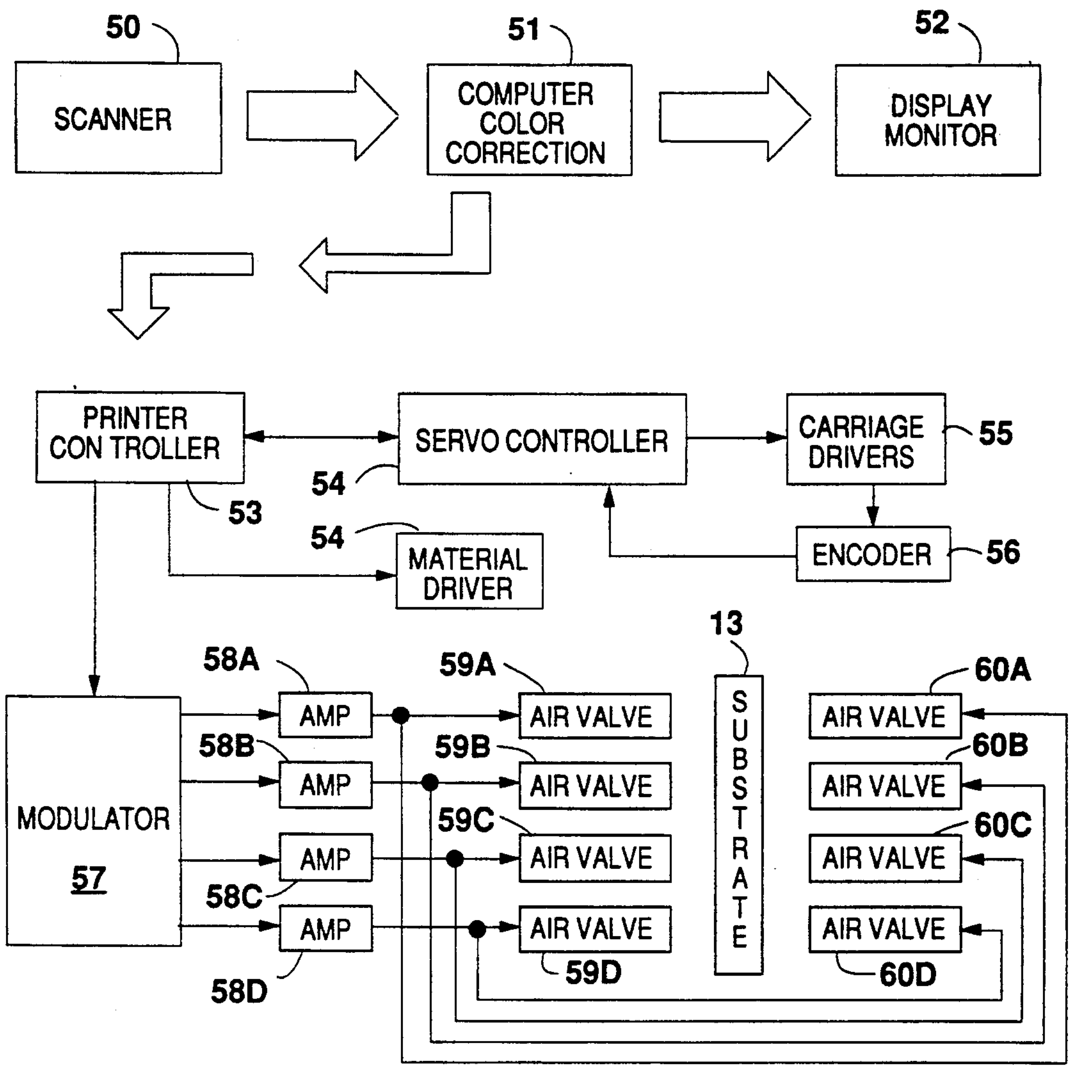
FIG. 6 is a schematic Showing the print control circuit of the preferred embodiment of the present invention.

Referring to FIG. 6, computer control of the print operation will be described. Scanner 50 scans a color image, pixel by pixel, to generate electrical signals representing the scanned image. The generated signals are then fed into color correction computer 51 which converts the scanned signals into signals that represent the color densities of each pixel. Computer 50 outputs the color density signals to both display monitor 52 and printer controller 53. Display monitor 52, which may be any conventional CRT display, visually displays the scanned image for the system operator. Computer 50 further outputs signals used to control the entire print operation to printer controller 53. Printer controller 53 comprises a CPU which serves to control the advancement of substrate 13 at the end of each printed line; the travel of the carriage mounted printheads 23 and 25 across rails 26 and 27, respectively; and the application of ink onto substrate 13 by ink spray heads 23A-D and 25A-D.

Material driver 54 comprises a stepper motor translator that turns the roller drive motors on and off in response to control signals received from printer controller 53. At the end of each printed line, printer controller 53 signals material driver 54 to turn on the roller drive motors. After substrate 13 has advanced one line, printer controller 53 signals material driver 54 to turn off the roller drive motors.

Servo-controller 54 functions to provide feedback signals to printer controller 53 and to control carriage drivers 55. The feedback signals are first measured by encoder 56 and relayed to servo-controller 54. Encoder 56 is a space encoder that develops signals representative of the speed and position of printheads 23 and 25 on rails 26 and 27, respectively. Printer controller 53 processes the feedback signals to produce control signals for the reversing motor described above with reference to FIG. 1-3. Printer controller 53 then outputs the control signals to servo-controller 54, which regulates carriage drivers 55 accordingly. Carriage drivers 55 are H-type bridge servo-amplifiers used to regulate the amount of power supplied to the reversing motor in accordance with the motor control signals. Thus, regulation of power is utilized to govern the speed and position of printheads 23 and 25 on their respective rails.

After receipt of the print density signals from computer 51, print controller 53 modifies the density of each pixel in accordance with user specified color adjustment control signals. That is, before each print operation, a system user has the option of adjusting the color of the image applied to the substrate. If the user has entered a color adjustment, printer controller 53 either adds or subtracts color density from the scanned print information before the final printhead control signals are relayed to modulator 57. Modulator 57 converts the color density signals into pulse signals used to modulate the length of time each of air valves 59A-D and 6OA-D remains open. However, before application to air valves 59A-D and 60 A-D, the signals generated by modulator 57 are amplified by amplifiers 58A-D. Modulator 57 produces four signals, with each signal controlling the application of a particular ink color. That is, the air valve corresponding to the desired ink color is opened in accordance with the generated control signals. Thus, air valves 59A-D and 6OA-D are activated either individually or concurrently to produce the desired color scheme.

In the preferred embodiment, printer controller 53 and modulator 57 operate to pulse width modulate the length of time air valves 59A-D and 6OA-D remain open, and thus, the length of time the pressurized air flows across the ink jet nozzles. At the beginning of each pixel, computer 51 transmits picture information corresponding to that pixel to print controller 53 which in turn relays the signal to modulator 57. Modulator 57 generates a pulse signal having a width, the duration of which coincides with the desired color density. Modulator 57 applies the generated pulse signal to the appropriate air valve to actuate the ink jet nozzle. Thus, an ink sprayhead is activated for the length of time required to produce the desired color perception on the substrate. Essentially, rather than vary the intensity of the ink flow rate, the present invention varies the time each sprayhead deposits ink onto the substrate. In other words, the selected sprayheads are turned on and left on until the desired color density for the particular pixel being printed is reached.

Figure 7:
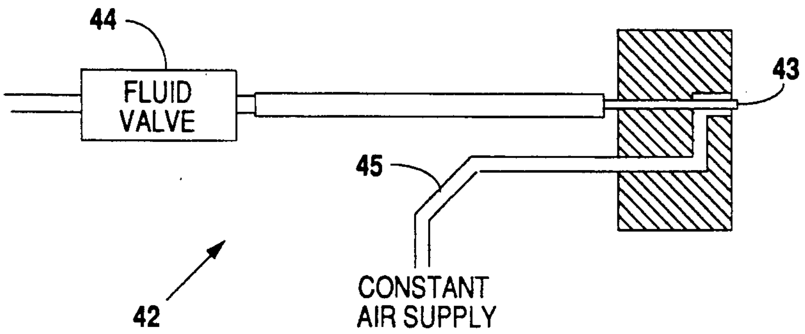
FIG. 7 is a cross-sectional view of the clear coating spray head of the preferred embodiment of the present invention.

Referring to FIG. 7, clear coating sprayhead 42 will be described. Clear coating sprayhead 42 may be optionally attached to printheads 23 and 25 to spray a protective clear coating over the reproduced image. Clear coating sprayhead 42 resides above sprayheads 23A-D and 25A-D to apply the protective coating after completion of each line. Clear coating sprayhead 42 comprises nozzle 43 which is in fluid communication with an ink source (not shown) via fluid valve 44. Additionally, nozzle 43 communicates with a constant air source (not shown) via passage 45. Unlike sprayheads 23A-D and 25A-D, clear coating sprayhead 42 modulates the ink flow rather than the air flow, with the air flow across nozzle 43 being continuous. At the beginning of each line, fluid valve 44 opens to permit the flow of the protective coating from nozzle 43. The air flowing across nozzle 43 picks up the protective coating and applies it to substrate 13. At the end of the line, fluid valve 44 shuts, thereby stopping the flow of protective coating from nozzle 43. On the next run of print heads 23 and 25, fluid valve 44 opens and the process is repeated. Thus, after the entire print operation is completed, the reproduced image will be covered with the clear protective coating.

Figure 8:
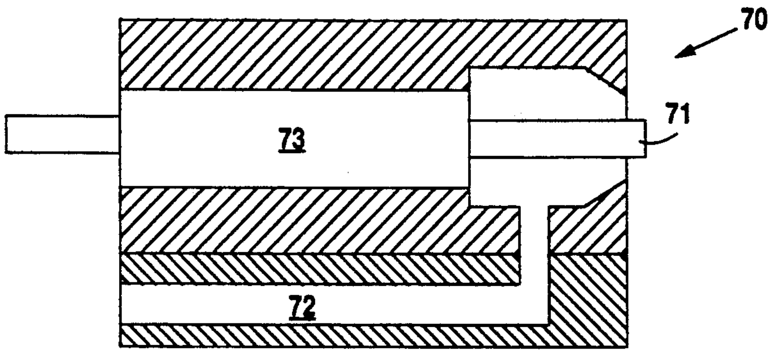
FIG. 8 is a cross-sectional view showing an alternative embodiment of the ink sprayheads of the present invention.

Referring to FIGS. 8, an alternative embodiment of the ink sprayheads and of the present invention will be described. Ink sprayhead 70 differs from the ink sprayheads of the preferred embodiment because the ink flow is modulated to control the color density rather than the air supply. Ink sprayhead 70 comprises ink jet 71 coupled to a constant air pressure source (not shown) via passage 72 which provides a continuous supply of air across ink jet 71. Ink sprayhead 70 further comprises ink valve 73 disposed between ink jet 71 and the ink reservoirs described with reference to FIG. 4. At the beginning of a pixel print, ink valve 73 opens to allow the flow of ink to ink jet 71. The air stream delivered past ink jet 71 picks up the ink and applies it to the substrate. When the desired pixel density is reached, ink valve 73 closes, and the flow of ink from ink jet 71 ceases. Thus, the modulation of ink valve 73 controls the pixel print densities.

Figure 9:
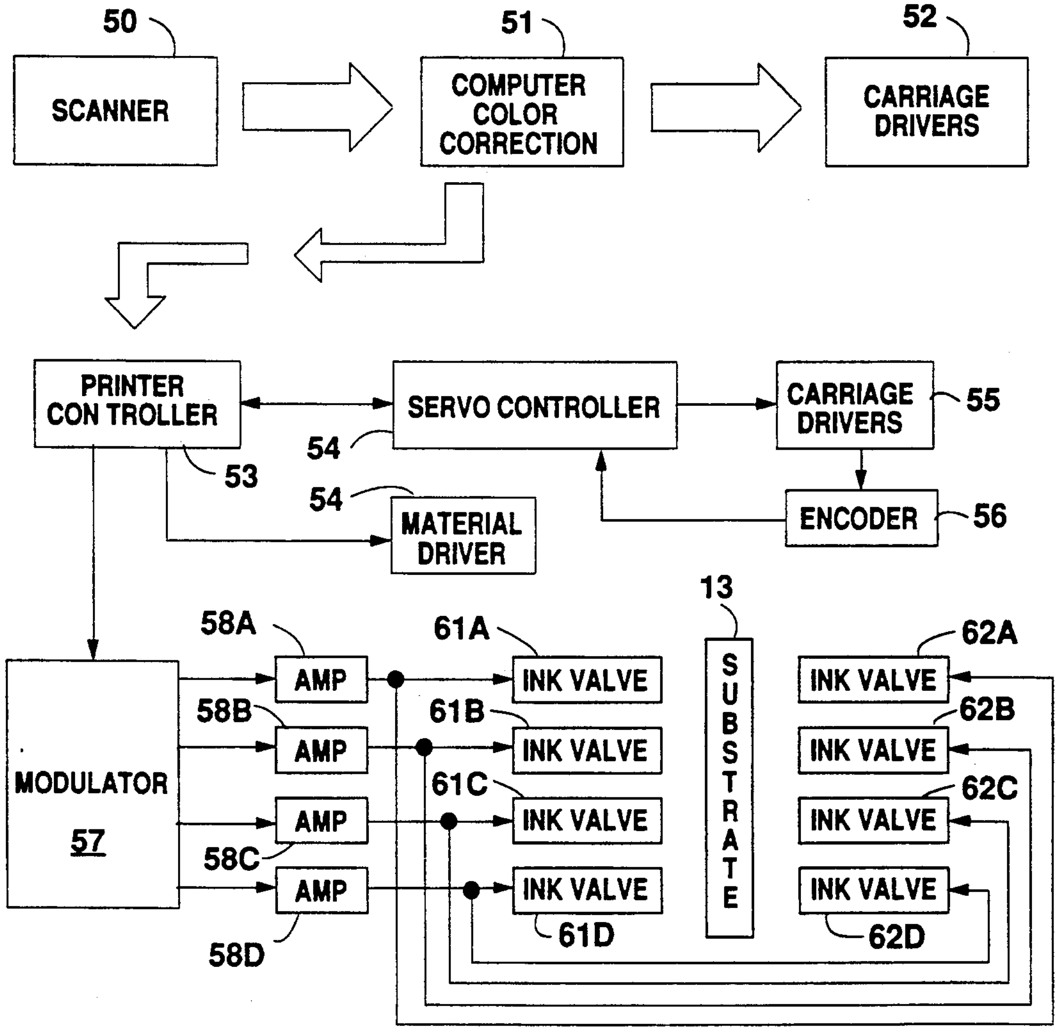
FIG. 9 is a schematic showing an alternative embodiment of the print control circuit of the present invention.

Referring to FIG. 9, an alternative embodiment of the control circuit shown in FIG. 6 will be described. The control circuit of FIG. 9 comprises the same components and operates identically to the control circuit of FIG. 6, except the control circuit of FIG. 9 modulates ink valves, described above in FIG. 8, rather than air valves. That is, the pulse signals generated by modulator 57 are used to pulse width modulate the opening and closing of ink valves 61A-D and 62A-D, thereby controlling the supply of ink to the ink jets. At the beginning of a pixel print, the ink valves of ink valves 61A-D and 62A-D necessary to produce the desired color are opened, starting the ink flow. The ink is delivered to the substrate under constant pressure until the desired pixel density is reached, as signalled by the end of the generated pulse signal. The opened valves close, stopping the flow of ink and ending the pixel print. The above control scheme, thus, also modulates the length of time that ink is supplied to the substrate.

Figure 10:
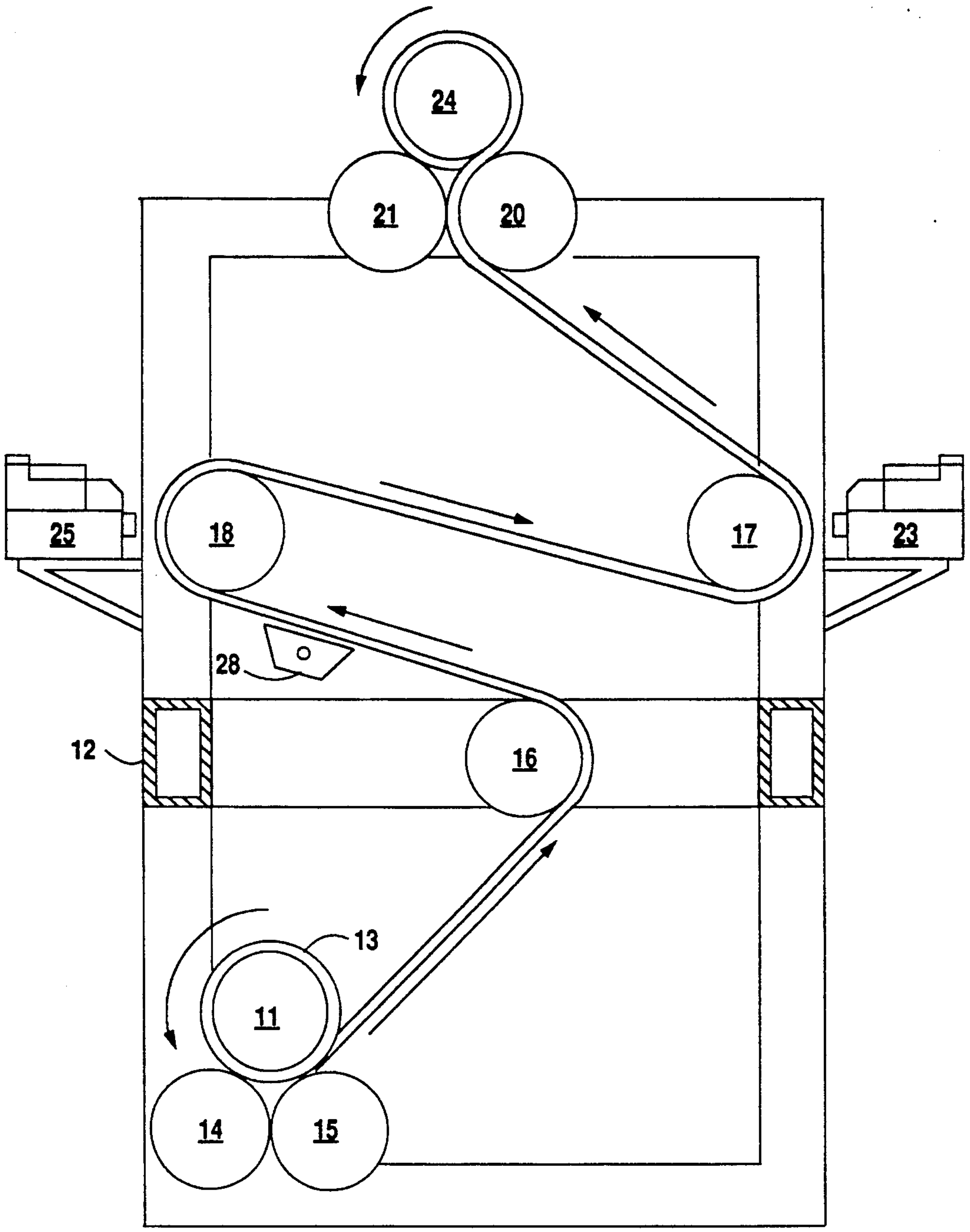
FIG. 10 is a side view of the ink jet printer of the present invention showing a second embodiment of the roller configuration and printhead assembly.

Referring to FIG. 10, a second embodiment of the printhead and roller configuration of the present invention will be described. In the second embodiment, the print heads, rollers and printing process remains the same, however, the positioning of the print heads and the torsion rollers are changed. In the second embodiment, the print heads are placed at opposite ends of the housing as shown in FIG. 10.

Figure 11:
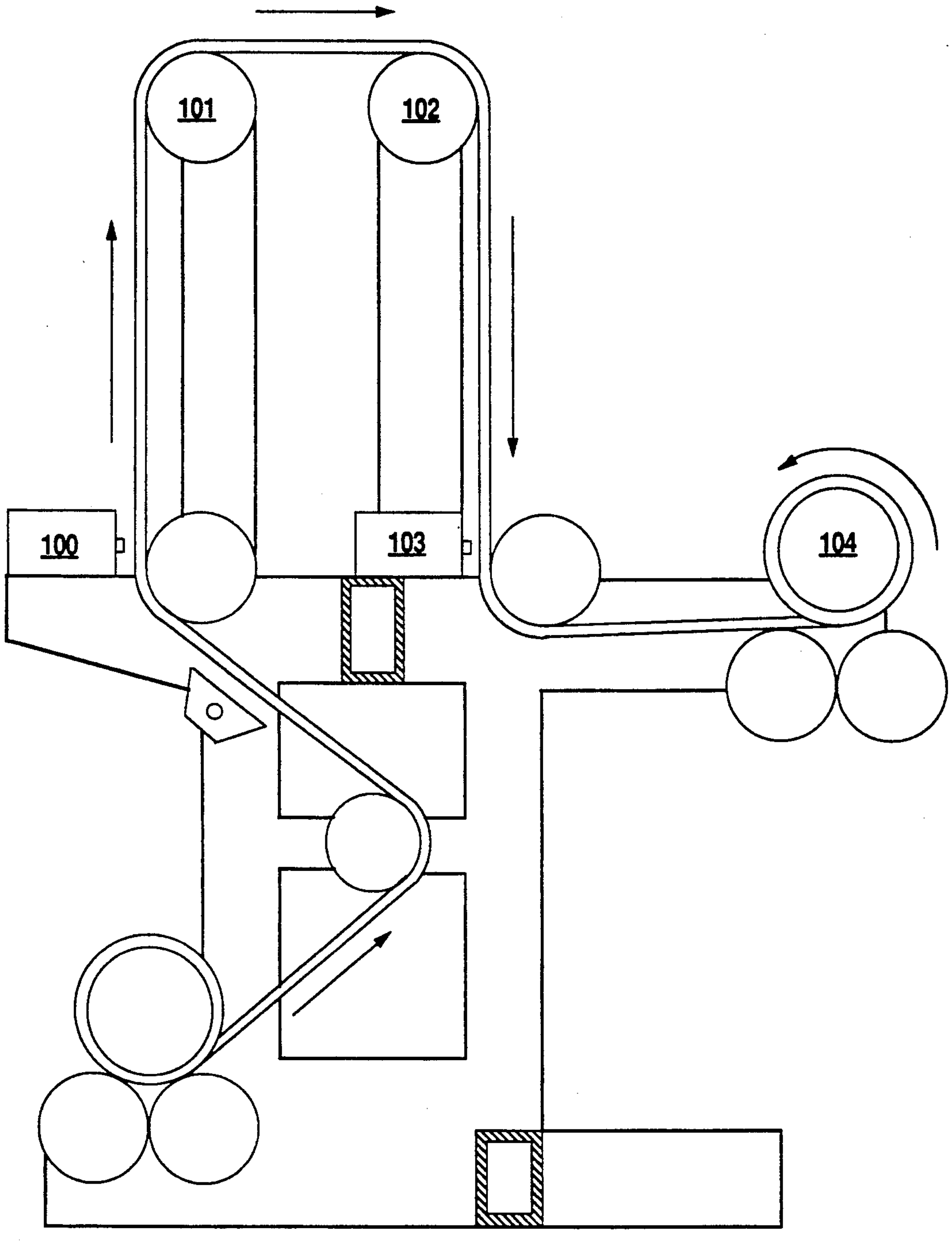
FIG. 11 is a side view of the present invention showing a third embodiment of the roller configuration and printhead assembly.

Referring to FIG. 11, a third embodiment of the printhead and roller configuration of the present invention will be described. In the third embodiment, the shape of the housing is altered so that the take up roller is positioned towards the back of the housing. In the third embodiment, the print heads are positioned facing the same direct spaced a short distance apart. As the substrate passes from the first roller one side passes print head 100 where ink is applied the substrate then circles past rollers 101 and 102 and down past print head 103 where the same pattern is applied by print head 103 before the substrate returns and winds about take-up roller 104.

From the foregoing description and illustration of this invention, it should be apparent that various modifications may be made by reconfigurations or combinations to produce similar results. It is, therefore, the desire of the Applicants not to be bound by the description of this invention as contained in this specification, but to be bound only by the claims appended hereto.

We claim:

1. An apparatus for reproducing an image comprising:

means for generating control signals representative of said image to be reproduced;

a substrate;

spray means in fluid communication with an ink source, said spray means operable to reproduce said image on both sides of said substrate;

means for supporting said spray means and for driving said spray means relative to said substrate;

a first pressurized air source communicating with said spray means, wherein the flow of air from said first pressurized air source around said spray means carries said ink to both sides of said substrate;

means for modulating the length of time said first air source flows around said spray means in response to said control signals; and a second pressurized air source in continuous communication with said spray means for supplying a continuous flow of air around said spray means to prevent ink build-up on on said spray means.

2. The apparatus according to claim 1, said spray means comprising first and second printheads positioned on opposite sides of said substrate.

3. The apparatus according to claim 2, further comprising means to maintain said substrate equidistant from said first and second printheads.

4. The apparatus according to claim 2, said first and second printheads comprising a plurality of ink jet sprayheads for spraying ink onto said substrate.

5. The apparatus according to claim 4, each of said plurality of ink jet sprayheads comprises an ink jet communicating with said ink source through a first conduit, said first pressurized air source through a second conduit, and said second pressurized air source through a third conduit.

6. The apparatus according to claim 5, each of said plurality of sprayheads further comprises a valve means interposed to said ink jet and said first pressurized air source, wherein said modulating means controls the length of time said valve means remains open to vary the density of said ink applied to said substrate.

7. The apparatus according to claim 6, said first pressurized air source being a low pressure air source.

8. The apparatus according to claim 7, said second conduit being of sufficiently large diameter to allow said low pressure air source to draw ink from said ink jet when said valve means is open.

9. The apparatus according to claim 8, said second pressurized air source being a high pressure air source.

10. The apparatus according to claim 9, said third conduit being of sufficiently small diameter to prevent said high pressure air source from drawing ink from said ink jet.

11. The sprayhead according to claim 10 further comprising means for regulating the flow of air from said high pressure air source.

12. An apparatus for reproducing an image comprising:

means for generating control signals representative of said image;

a substrate;

spray means positioned on opposite sides of said substrate to reproduce said image on both sides of said substrate, said spray means being in fluid communication with an ink source;

means for supporting said spray means and driving said spray means relative to said substrate;

a pressurized air source communicating with said spray means, wherein the flow of air around said spray means carries said ink to both sides of said substrate;

means for modulating the length of time said pressurized air source flows around said spray means in response to said control signals; and a second pressurized air source in continuous communication with said spray means for supplying a continuous flows of air around said spray means to prevent ink build-up on said spray means.

13. The apparatus according to claim 12, said spray means comprising first and second printheads.

14. An apparatus for reproducing an image, comprising:

means for generating control signals representative of sad image to be reproduced;

a substrate;

spray means positioned on opposite sides of said substrate to reproduce said image on both sides of said substrate, said spray means being in fluid communication with an ink source;

means for supporting said spray means and for driving said spray means relative to said substrate;

a first pressurized air source communicating with said spray means, wherein the flow of air around said spray means carries said ink to both sides of said substrate;

means for modulating the length of time said first air source flows around said spray means in response to said control signals; and a second pressurized air source in continuous communication with said spray means for supplying a continuous air flow around said spray means to prevent ink build-up on said spray means.

15. The apparatus according to claim 14, further comprising scanning means for scanning said image to be reproduced and supplying said control signal generating means with said scanned signals, said control signal generating means generating said control signals from said scanned signals.

16. The apparatus according to claim 15, further comprising means for supporting and transporting said substrate relative to said spray means.

17. The apparatus according to claim 16, said spray means comprising first and second printheads.

* * * * *